US012152419B2

(12) United States Patent
Okeke et al.

(10) Patent No.: US 12,152,419 B2
(45) Date of Patent: Nov. 26, 2024

(54) MASTER RATCHET AND SLAVE CATCH FOR LATCHES OF MOTOR VEHICLES

(71) Applicant: MAGNA CLOSURES INC., Newmarket (CA)

(72) Inventors: Uzochukwu Okeke, Bradford (CA); Csaba Szente, Newmarket (CA)

(73) Assignee: MAGNA CLOSURES INC., Newmarket (CA)

( * ) Notice: Subject to any disclaimer, the term of this patent is extended or adjusted under 35 U.S.C. 154(b) by 247 days.

(21) Appl. No.: 17/329,973

(22) Filed: May 25, 2021

(65) Prior Publication Data

US 2021/0372173 A1 Dec. 2, 2021

Related U.S. Application Data

(60) Provisional application No. 63/031,271, filed on May 28, 2020.

(51) Int. Cl.

| | |
|---|---|
| ***E05B 83/38*** | (2014.01) |
| ***E05B 77/04*** | (2014.01) |
| ***E05B 77/06*** | (2014.01) |
| ***E05B 79/20*** | (2014.01) |
| ***E05B 81/20*** | (2014.01) |
| ***E05B 85/04*** | (2014.01) |

(52) U.S. Cl.

CPC .............. *E05B 83/38* (2013.01); *E05B 77/04* (2013.01); *E05B 77/06* (2013.01); *E05B 79/20* (2013.01); *E05B 81/20* (2013.01); *E05B 85/04* (2013.01)

(58) Field of Classification Search

CPC .......... E05B 83/38; E05B 83/40; E05B 85/04; E05B 85/20; E05B 85/24; E05B 85/243; E05B 85/245; E05B 85/26; E05B 77/02; E05B 77/04; E05B 77/10; E05B 77/52; E05B 81/20

See application file for complete search history.

(56) References Cited

U.S. PATENT DOCUMENTS

| | | | | |
|---|---|---|---|---|
| 9,745,773 | B2 | 8/2017 | Halliwell | |
| 10,337,227 | B2 * | 7/2019 | Stoof | E05D 15/58 |
| 10,669,751 | B2 * | 6/2020 | Kim | E05B 81/66 |
| 11,135,904 | B2 * | 10/2021 | Ottolini | E05B 85/04 |
| 11,377,880 | B2 * | 7/2022 | Mihail | B60N 2/01583 |
| 11,377,881 | B2 * | 7/2022 | Bartola | E05B 83/26 |
| 11,383,588 | B2 * | 7/2022 | Yokogawa | B60J 5/0479 |
| 2003/0111863 | A1 | 6/2003 | Weyerstall et al. | |
| 2009/0134638 | A1 | 5/2009 | Kutschat | |
| 2009/0230699 | A1 | 9/2009 | Carabalona | |
| 2020/0080348 | A1 | 3/2020 | Cappelli et al. | |
| 2022/0364398 | A1 * | 11/2022 | Matsuda | E05B 85/04 |

FOREIGN PATENT DOCUMENTS

DE 102018007926 A1 * 2/2020

* cited by examiner

*Primary Examiner* — Kristina R Fulton
*Assistant Examiner* — Noah Horowitz

(57) ABSTRACT

A latch for a closure panel of a vehicle, the latch comprising: a housing; a ratchet mounted to the housing for releasably securing a striker in a slot; a catch mounted to the housing for releasably securing a secondary striker; and a linkage connecting the catch to the ratchet; wherein the ratchet and the catch move in tandem with one another via the linkage.

20 Claims, 16 Drawing Sheets

MASTER RATCHET AND SLAVE CATCH FOR LATCHES OF MOTOR VEHICLES

CROSS-REFERENCE TO RELATED APPLICATION

This application claims priority from the benefit of the filing date of U.S. Provisional Patent Application No. 63/031,271 filed on May 28, 2020, entitled "MASTER RATCHET AND SLAVE CATCH FOR LATCHES OF MOTOR VEHICLES", the contents of which are herein incorporated by reference.

FIELD

The present disclosure relates generally to door systems for motor vehicles. More particularly, the present disclosure relates to an opening system to operate a vehicle door.

BACKGROUND

This section provides background information related to door systems for motor vehicles which is not necessarily prior art to the inventive concepts associated with the present disclosure.

Many pick-up trucks include a passenger cab having a rear seat positioned behind a front row of seats for accommodating additional passengers. These pick-up trucks typically include a third or fourth rear door located directly behind a front door to aid passengers when entering and exiting the rear seats. The rear door also provides convenient access to the space behind the front row of seats during loading and unloading of items. In certain pick-up trucks, the front and rear doors swing open in opposite directions from one another, historically referred to as a "clamshell design".

The trend of vehicle design is to improve accessibility and this can be accommodated for by eliminating the B pillar and/or in situations where adequate support portions of the vehicle body are minimized (e.g. for sliding cargo doors). Unfortunately, on a vehicle with no B-pillar, during a frontal crash the roof of the vehicle tends to be displaced upwards (i.e. buckles upwards). This buckling can exert excessive loads on the latch, thus precipitating undesirable unlatching of the latch during the crash, especially in these situations where the B-pillar is lacking or where adequate support portions of the vehicle body are minimized.

A typical solution to account for buckling is to add catcher pins, however, some latch packaging does not allow enough room for these pins. Further, the kinematics of door swing may not allow the use of the catcher pins to work as desired during the crash.

While current door systems are sufficient to meet all regulatory requirements and provide the desired levels of comfort and convenience, a need exists to continue development of advanced technology and provide alternative arrangements and features that provide enhanced safety, comfort and convenience to the user. Especially whereby additional equipment can be provided to enhance and thus address safety concerns for operation of conventional equipment.

SUMMARY

This section provides a general summary of the inventive concepts associated with the present disclosure. Accordingly, this section is not intended to be interpreted as a comprehensive and exhaustive listing of all features, aspects, objectives and/or advantages associated with the inventive concepts which are further described and illustrated in the following detailed description and the appended drawings.

It is an objective of the present disclosure to provide a latching system for a closure panel of a vehicle.

An aspect provided is a latch for a closure panel of a vehicle, the latch comprising: a housing; a ratchet mounted to the housing for releasably securing a striker in a slot; a catch mounted to the housing for releasably securing a secondary striker; and a linkage connecting the catch to the ratchet; wherein the ratchet and the catch move in tandem with one another via the linkage.

A second aspect provided is a method of opening a latch for a closure panel of a vehicle, the method comprising the steps of: releasing a ratchet mounted to a housing of the latch in order to unconstrain the ratchet from a striker; moving the ratchet in tandem with a catch in order to unconstrain the catch from a secondary striker, the catch mounted to the housing such that movement of the catch is coupled to movement of the ratchet by a linkage; and unlatching the latch by displacing the striker from the ratchet while also displacing the secondary striker from the catch.

A third aspect provided is a method of closing a latch for a closure panel of a vehicle, the method comprising the steps of: entering a striker in to a slot of a ratchet, the ratchet mounted to a housing of the latch in order to constrain the striker when latched; moving the ratchet in tandem with a catch in order to constrain a secondary striker by the catch, the catch mounted to the housing such that movement of the catch is coupled to movement of the ratchet by a linkage; and releasably latching the latch by inhibiting further movement of the ratchet in conjunction with inhibiting further movement of the catch by the linkage, thereby constraining the striker by the ratchet while also constraining the secondary striker by the catch.

Further aspects provided are: a cinch mechanism having a cinch arm configured to operate the ratchet from a partially closed position to a fully closed position; cinch arm is coupled to the ratchet via a cinch lever arm; the cinch arm is coupled to the striker via a cinch lever arm; the cinch arm is coupled to the catch via a cinch lever arm; a plurality of the catches, such that each of the catches are configured to constrain a respective one of a plurality of the secondary strikers; the ratchet is a master ratchet and the catch is a slave ratchet; and the latch further comprises a controller for operating a corresponding actuator to assist in movement of the master ratchet.

FIGURES

The drawings described herein are provided to illustrate selected, at least one non-limiting embodiment associated with the present disclosure and are not intended to limit the scope of the present disclosure.

FIG. 1*a* is a side view of a motor vehicle;

FIG. 1*b* is an alternative embodiment of the vehicle of FIG. 1*a;*

FIG. 2*a, b, c, d* show alternate operational views of doors of the vehicle of FIG. 1;

FIG. 3*a, b* are side views of an example embodiment of a latch of the motor vehicle of FIG. 1 including a cinch mechanism;

FIG. 4 is an perspective view of a latching system for the motor vehicle of FIG. 1;

FIGS. 5, 6, 7, 8, 9, 10*a*, 10*b* are alternate views and operational states of the latch of FIG. 4;

Figure 4:
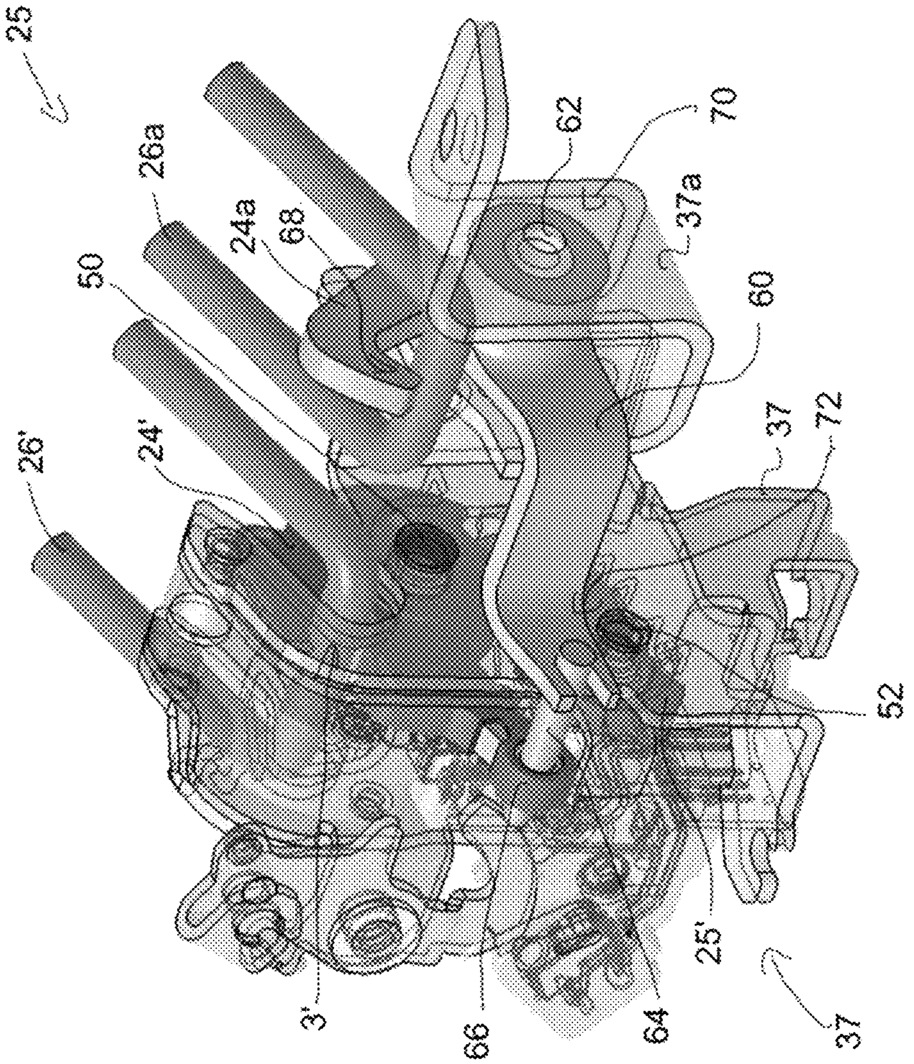
Figure 13B:
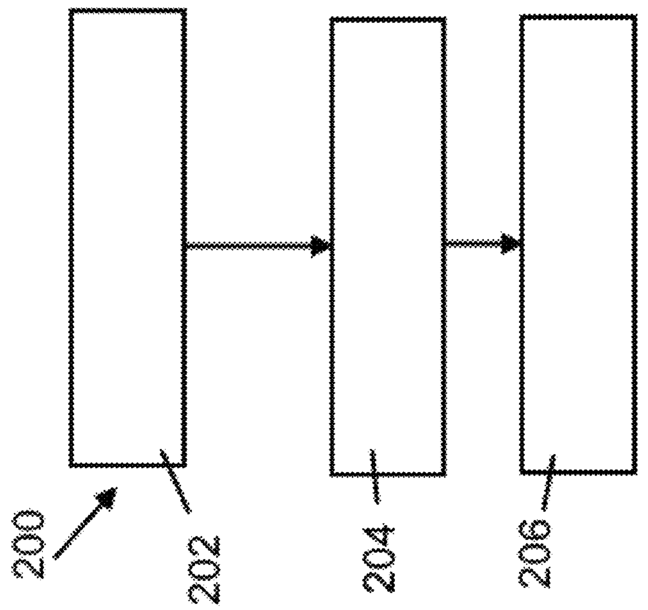
Figure 13A:
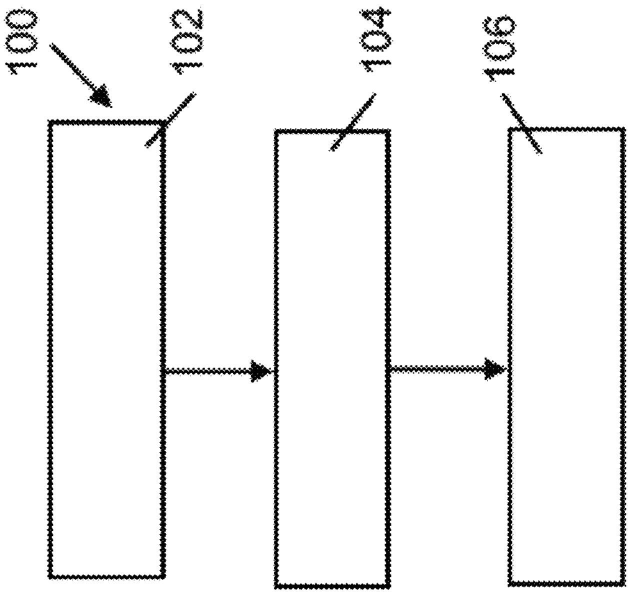

FIGS. 13*a*, 13*b* are example operations of the latch of FIG. 4.

Corresponding reference numerals are used to indicate corresponding components throughout the several views of the drawings.

DETAILED DESCRIPTION

Example embodiments will now be described more fully with reference to the accompanying drawings. To this end, the example embodiments are provided so that this disclosure will be thorough, and will fully convey its intended scope to those who are skilled in the art. Accordingly, numerous specific details are set forth such as examples of specific components, devices, and methods, to provide a thorough understanding of embodiments of the present disclosure. However, it will be apparent to those skilled in the art that specific details need not be employed, that example embodiments may be embodied in many different forms, and that neither should be construed to limit the scope of the present disclosure. In some example embodiments, well-known processes, well-known device structures, and well-known technologies are not described in detail.

In the following detailed description, the expression "latch assembly" will be used to generally, as an illustrative example, indicate any power-operated latch device adapted for use with a vehicle closure panel to provide at least a power release and/or cinching feature. Additionally, the expression "door" will be used to indicate any element moveable between an open position and at least one closed position, respectively opening and closing an access to an inner compartment of a motor vehicle and therefore includes, without limitations, deck lids, tailgates, lift gates, bonnet lids, and sunroofs in addition to the sliding or pivoting side passenger doors of a motor vehicle to which the following description will make explicit reference, purely by way of example.

Figure 1A:
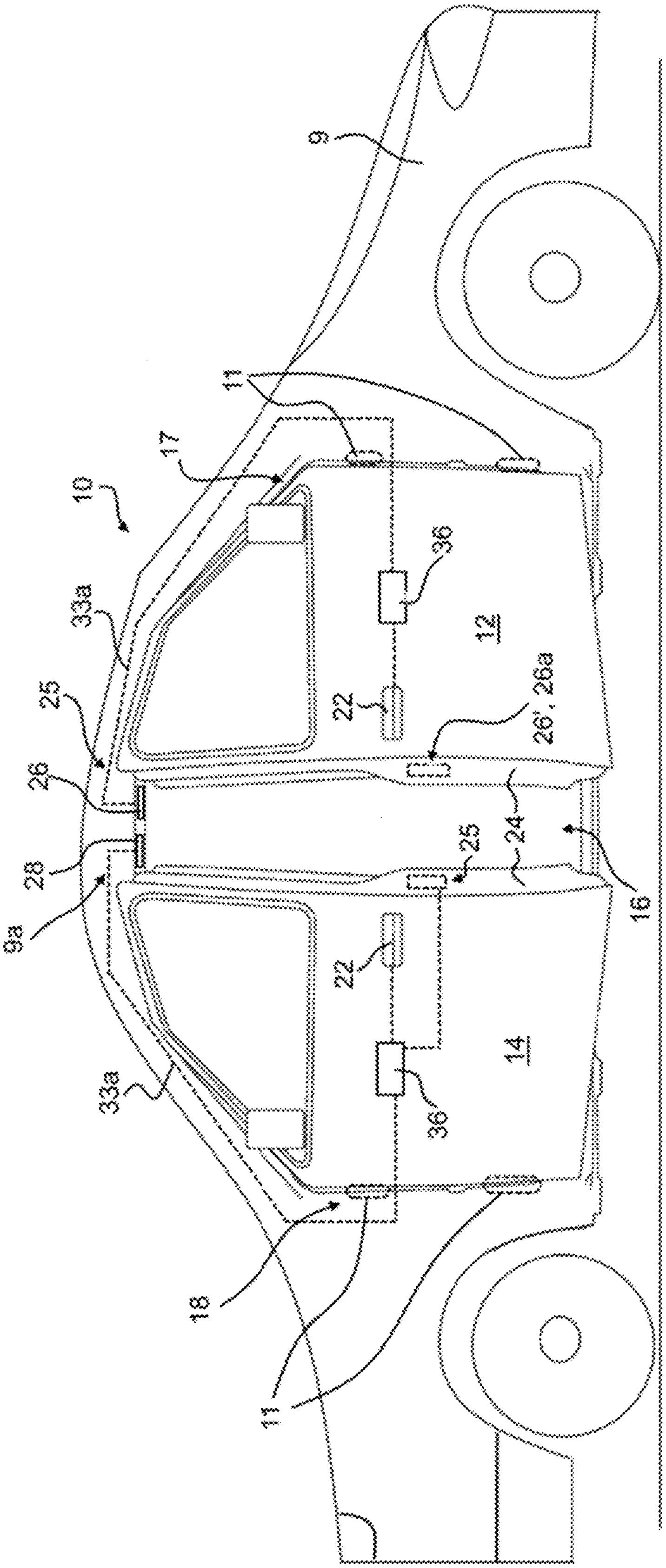
Figure 1B:
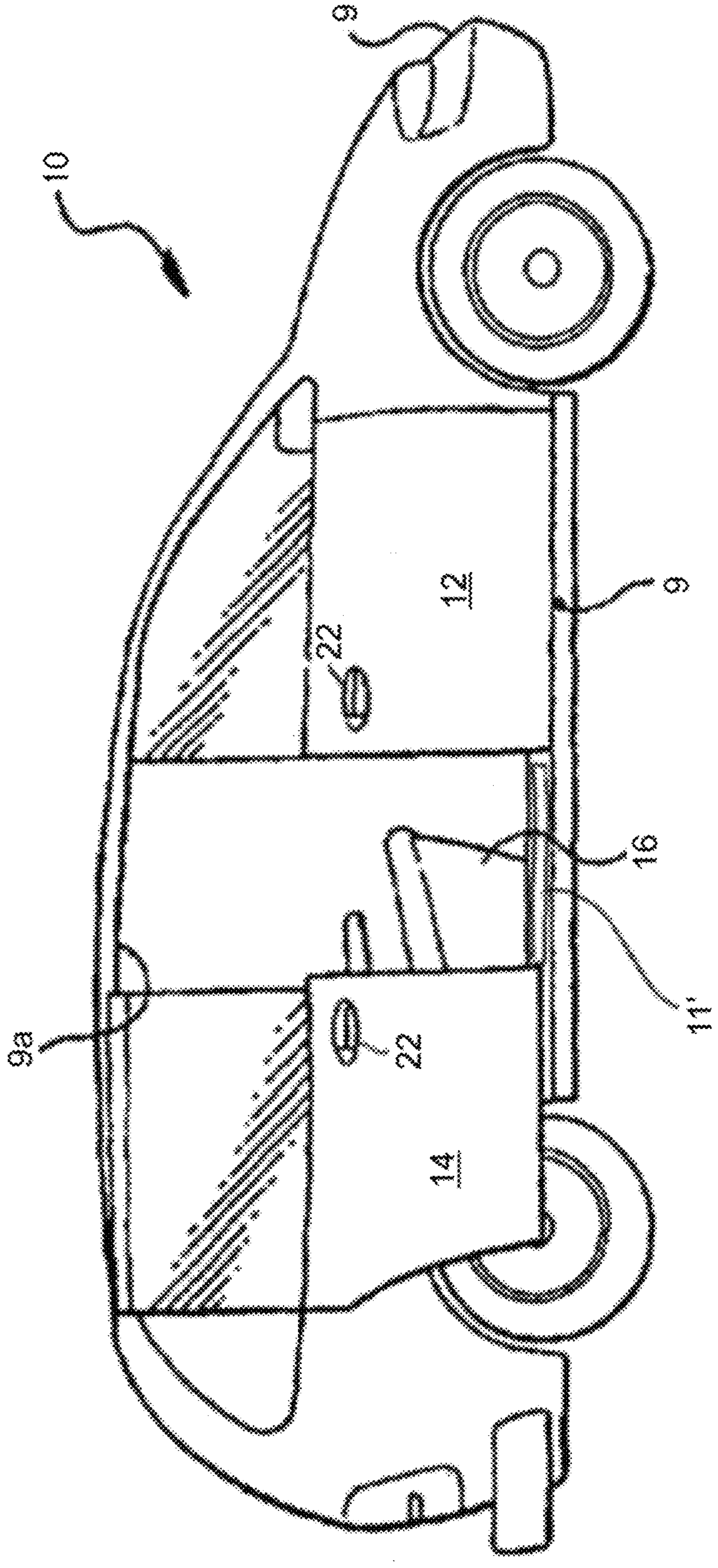

Referring to FIG. 1*a*, a vehicle 10 includes two primary doors 12 (one shown) and one or more secondary (e.g. rear or third) door(s) 14 directly rearward thereto for providing access to a passenger compartment 16. Illustratively as shown in FIG. 1A, the vehicle 10 is configured with a B-pillarless door configuration without a B-pillar positioned between the front door 12 and the rear door 14. In the embodiments shown, the vehicle 10 can be a car or a utility vehicle such as a van, as desired, such that the secondary door 14 is hinged to a vehicle body 9. Referring to FIG. 1*b*, shown is the vehicle 10 as a utility vehicle, e.g. a minivan, having a sliding version of the secondary door 14 mounted on the body 9 via a sliding track 11'. Referring again to FIG. 1*a*, the front/primary door 12 is mounted (e.g. hinges 11) along an A-pillar 17 and the rear door 14 is mounted (e.g. hinges 11) along a C-pillar 18, thereby obviating the need for a B-pillar between the A-pillar 17 and the C-pillar 18. The primary door 12 and the secondary door 14 can open in opposite or alternate directions (e.g. hinged vs. sliding in terms of FIG. 3) to allow individuals to comfortably enter and exit a rear portion of the passenger compartment 16. In addition, easy loading and unloading of items into and out of the rear portion of the passenger compartment 16 can be provided when the primary 12 and secondary 14 doors are both open.

Handle assemblies, generally indicated at 22, are fixedly secured to the doors 12, 14 and are disposed adjacent a forward vertical edge 24 thereof. The handle assemblies 22 can be each operatively coupled to their respective (e.g. upper) door latches 26, 28, hereafter referred to as first latch 26 and second latch 28 of multiple latches 25 (e.g. two or more latches), by links 33*a* (e.g. Bowden cables), hereafter referred to generically as links 33. Further, the latches 26, 28 can be referred to as a pair of latches 25. The handles 22 can be used to operate their respective latches 25 via concurrent operation of respective links 33. The latches 26, 28 can be mounted on a body 9 of the vehicle 10, as further described below, in conjunction with their respective strikers 26', 28' mounted on the door 12, 14. Alternatively, the latches 26, 28 can be mounted on the door 12, 14 and the strikers 26', 28' can be mounted on the body 9, as desired.

Figure 3A:
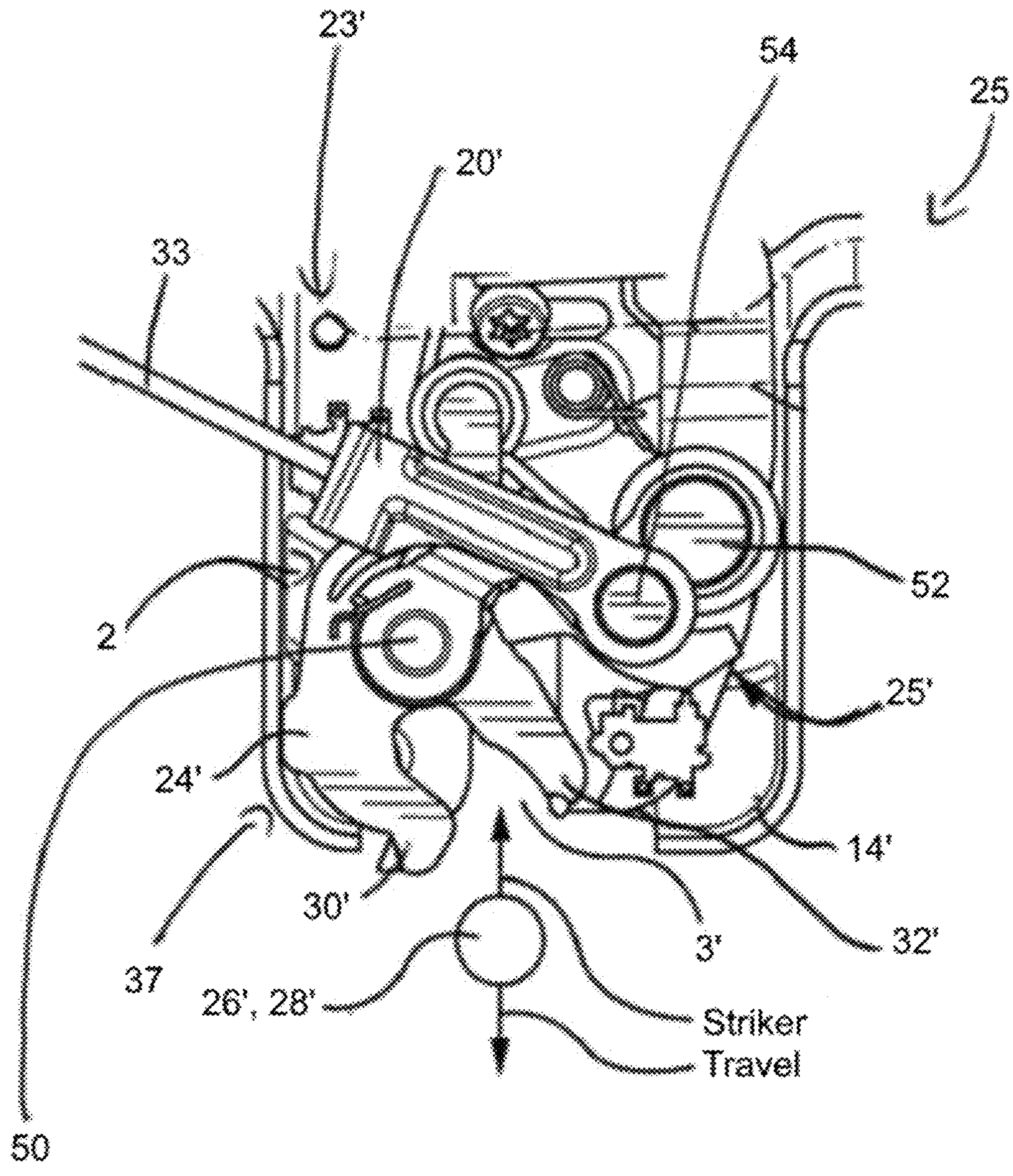
Figure 3B:
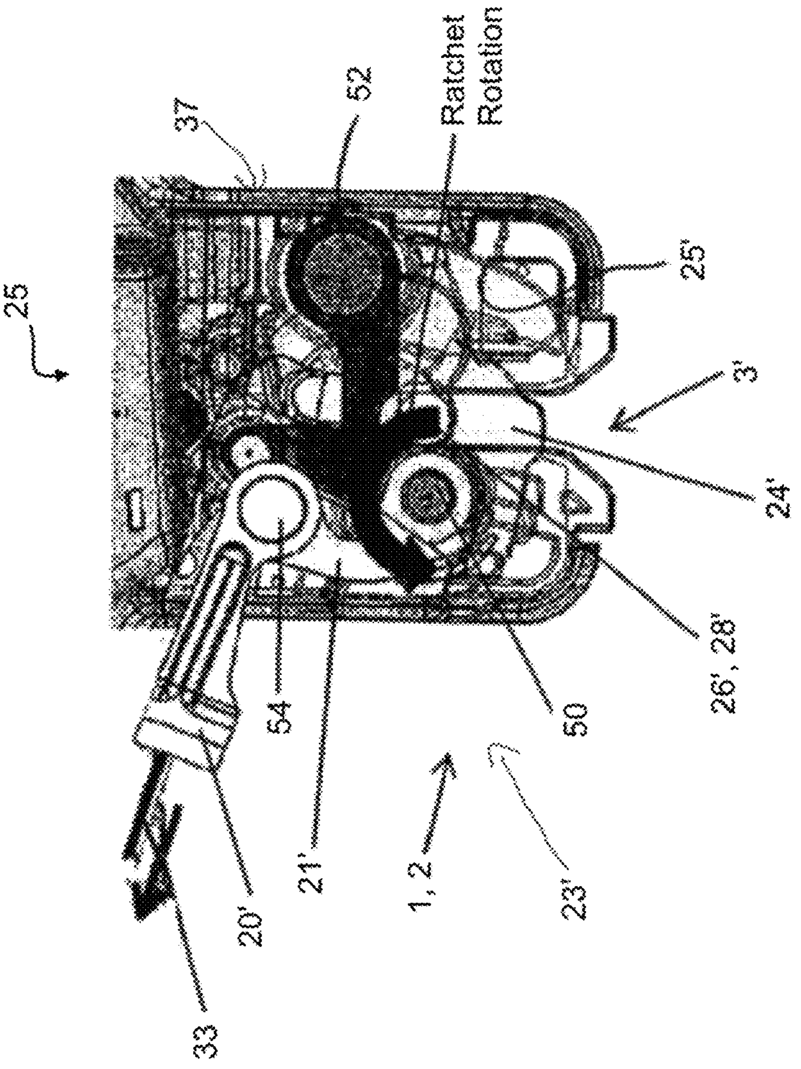

For example, in activation of the latches 25 (see FIGS. 3*a*, 3*b* for example configuration of latch components 23', the handle 22 can have a microswitch provided thereon to detect an activation of the handle 22 can be electrically coupled (shown as dotted line link 33 in FIGS. 1*a, b*) directly to, or indirectly via a controller (e.g. a latch controller 36 coupled to an actuator 36—e.g. an electric motor) to control the operation of the latches 25 for a power release operation to actuate release levers moving the pawl(s) 25' from a ratchet(s) 24' holding position to a ratchet(s) 24' release position (see FIGS. 3*a*, 3*b*).

Referring to FIGS. 2*a*, 2*b*, 2*c*, 2*d*, the doors 12,14 are shown in various states of open and close, independently, as facilitated by operation of their respective latches 26, 28.

Figure 9:
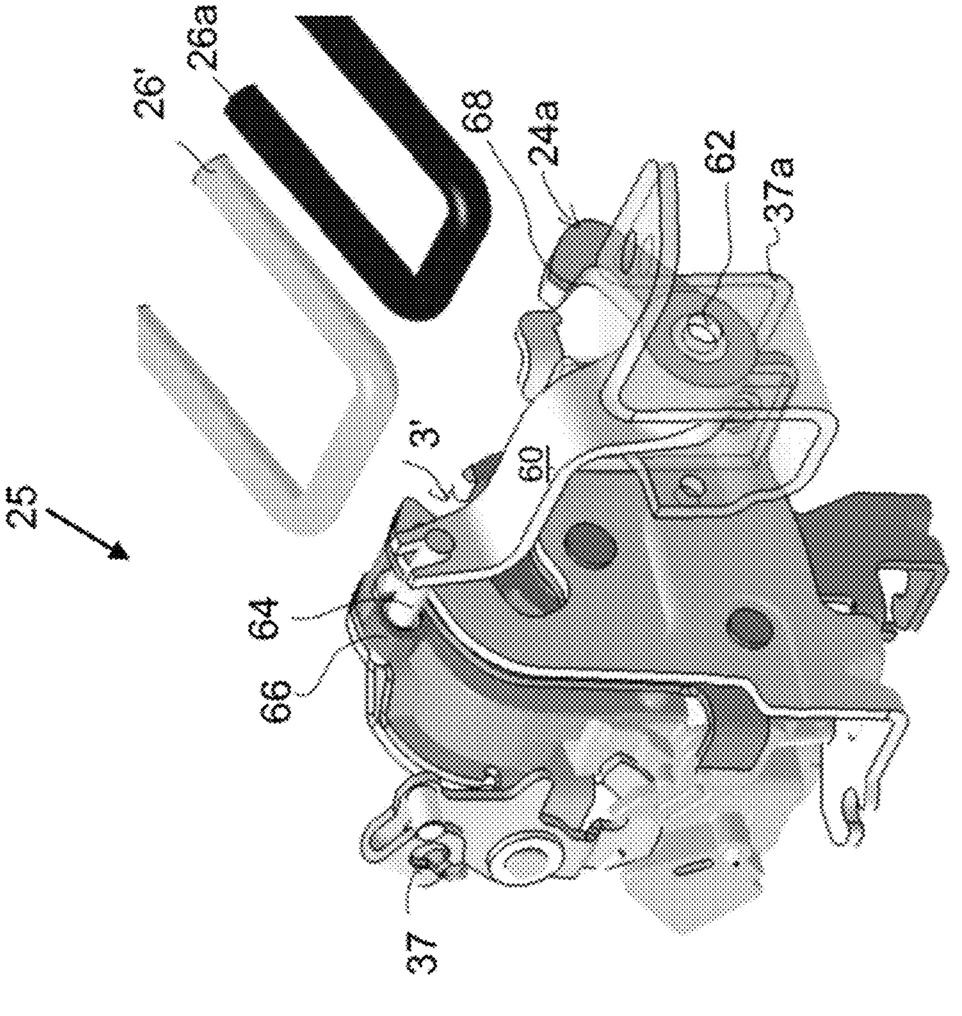

Referring to FIG. 4, shown is a further embodiment of the latches 25, by example described using reference numerals (e.g. 26, 26', etc.) for the latch 26 of the door 12. However, it is recognized that the latch 25 shown in FIG. 4 could also be used to describe the corresponding similar latch components 23' for the latch 28 of the door 14. In general, the latch 25 (referring to either latch 26, 28 generically) has a housing 37 with a housing portion 37*a* connected thereto. The housing portion 37*a* has a pivot 62 for connecting a catch 24*a* having a hook portion 68, for interacting with a secondary striker 26*a*. In other words, the catch 24*a* pivots about pivot 62 in order to position the hook 68 towards or away (see FIG. 9) from the secondary striker 26*a*. Based on the position of the catch 24*a* about the pivot 62, the catch 24*a* will either act to constrain the secondary striker 26*a* with the hook 68 (see FIG. 4) or the catch 24*a* will act to provide for the secondary striker 26*a* to be unconstrained by the hook 68 (see FIG. 9). Latch 25 may be provided on the bottom rocker panel of the vehicle 10 and/or on the top sill of the vehicle 10, on the top and/or bottom portions of the door 12, 14, or may be provided on one of the doors 12, 14 for engagement with a primary striker 26' and a secondary striker 26*a* provided on the other of the doors 12, 14, as shown in phantom outline in FIG. 1A, as illustrative examples.

Figure 2A:
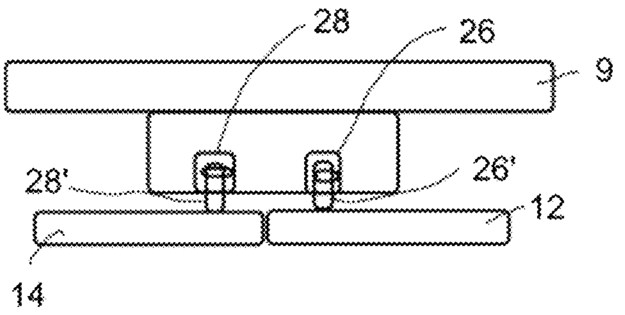
Figure 2B:
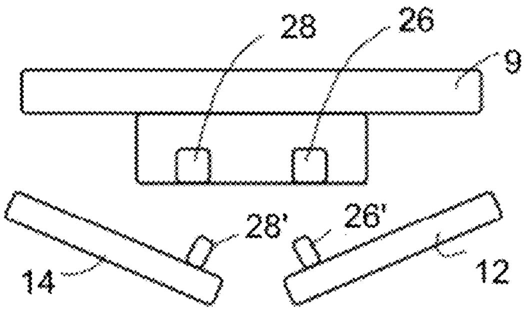
Figure 2C:
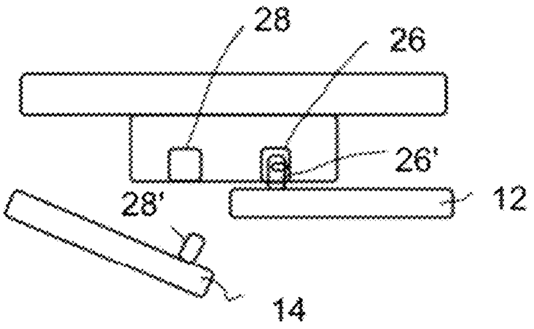
Figure 2D:
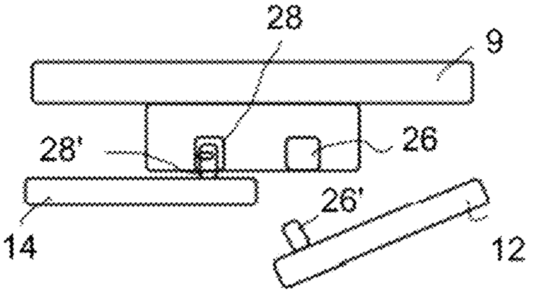

Referring again to FIG. 9, shown is a linkage 60 connected to the catch 24*a* (e.g. about the pivot 62) at one end 70 and to the ratchet 24' at another end 72 (see FIG. 4). The end 72 can be coupled to the ratchet 24' at a connection 66 via a pin 64. During operation, the ratchet 24' rotates about shaft 50 (connected to the housing 37), causing the end 72 of the linkage 60 to move conjointly with the movement of the ratchet 24'. As the end 72 moves, the end 70 of linkage 60 is rotated about the pivot 62. As the catch 24*a* is connected to the end 70, the catch 24*a* is also rotated about the pivot 62 as the linkage is rotated about the pivot 62. Accordingly, the ratchet 24' and the catch 24*a* are rotated conjointly, thus providing for the striker 26' to become unconstrained by a slot 3' of the ratchet 24' and the secondary striker **26*a* to become unconstrained by the hook 68 of the catch 24*a*. When unconstrained, the striker 26' and the secondary striker 26*a* are removed from the vicinity of the latch 25 when the door 12 is open (see FIGS. 2*b*, 2*d*). On the contrary, when constrained, the striker 26' and the secondary striker 26*a* are adjacent to the vicinity of the latch 25 when the door 12 is closed (see FIGS. 2*a*, 2*c*). As shown in FIGS. 2*a, b, c, d*, the doors 12, 14 and their corresponding latches 26, 28 can be operated independently of one another. Further, it is recognized that the latches 26, 28 can each have their respective catch 24*a*, linkage 60 and connection 66 to their ratchet 24'**.

Figure 5:
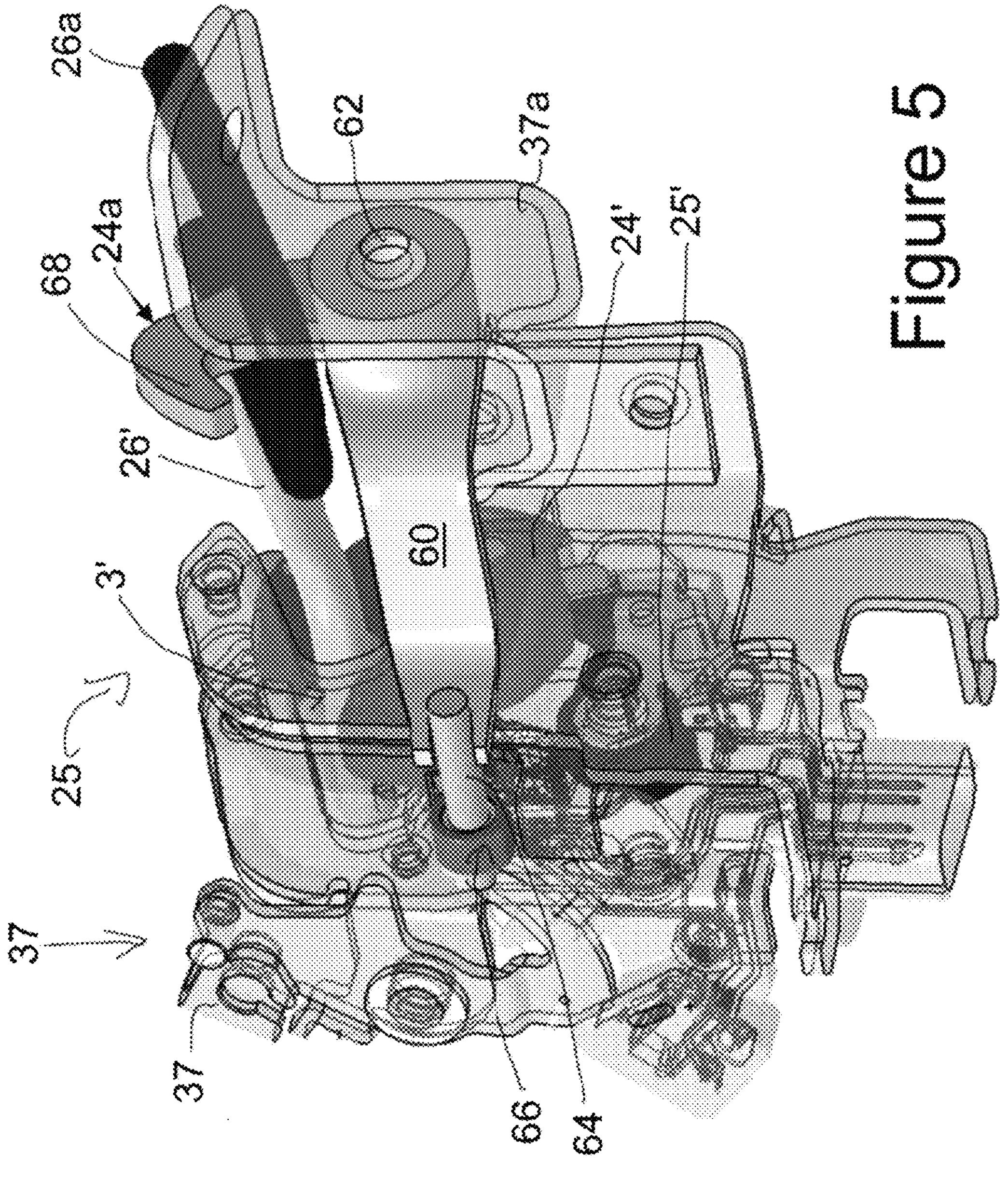
Figure 7:
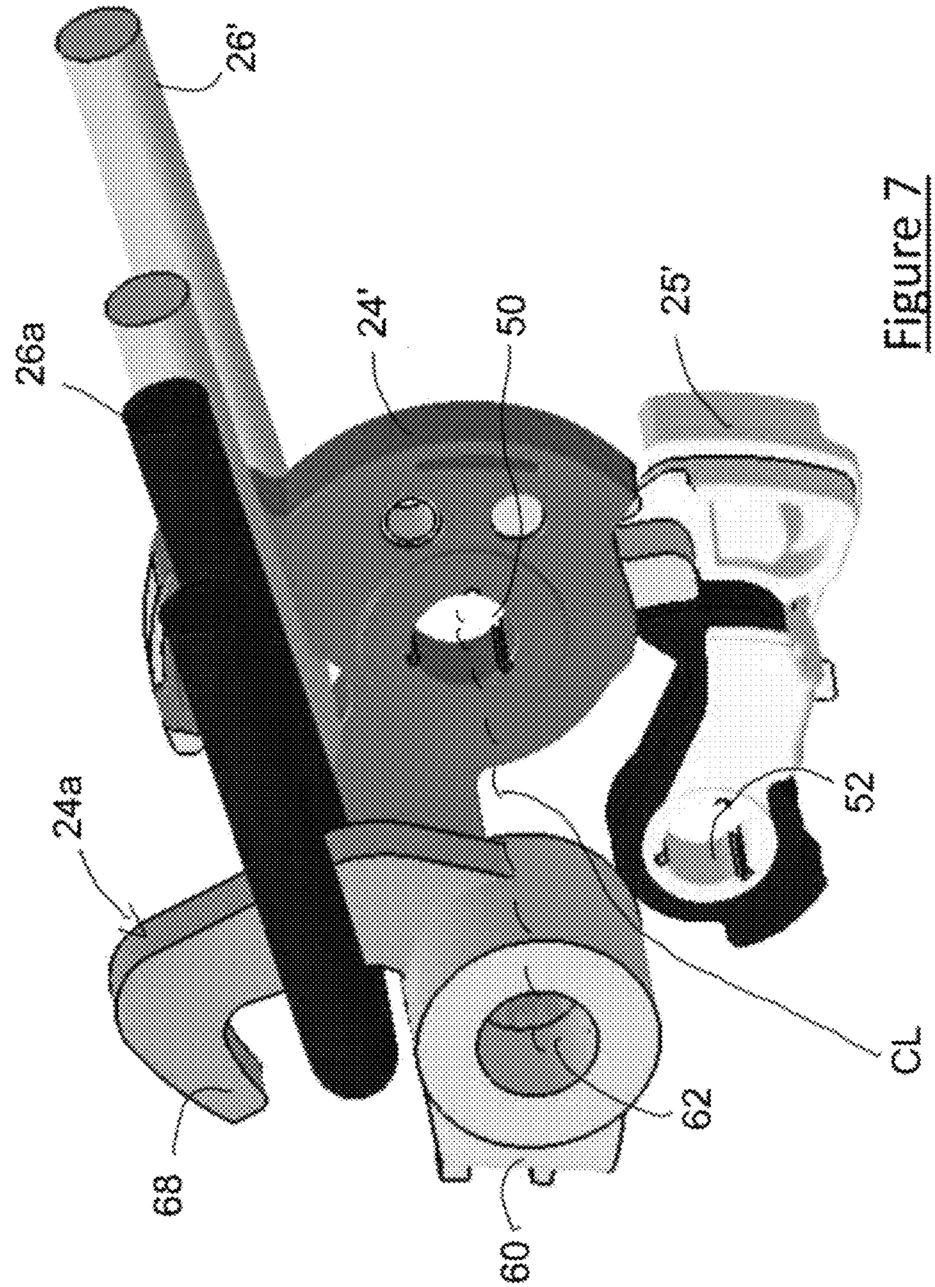
Figure 8:
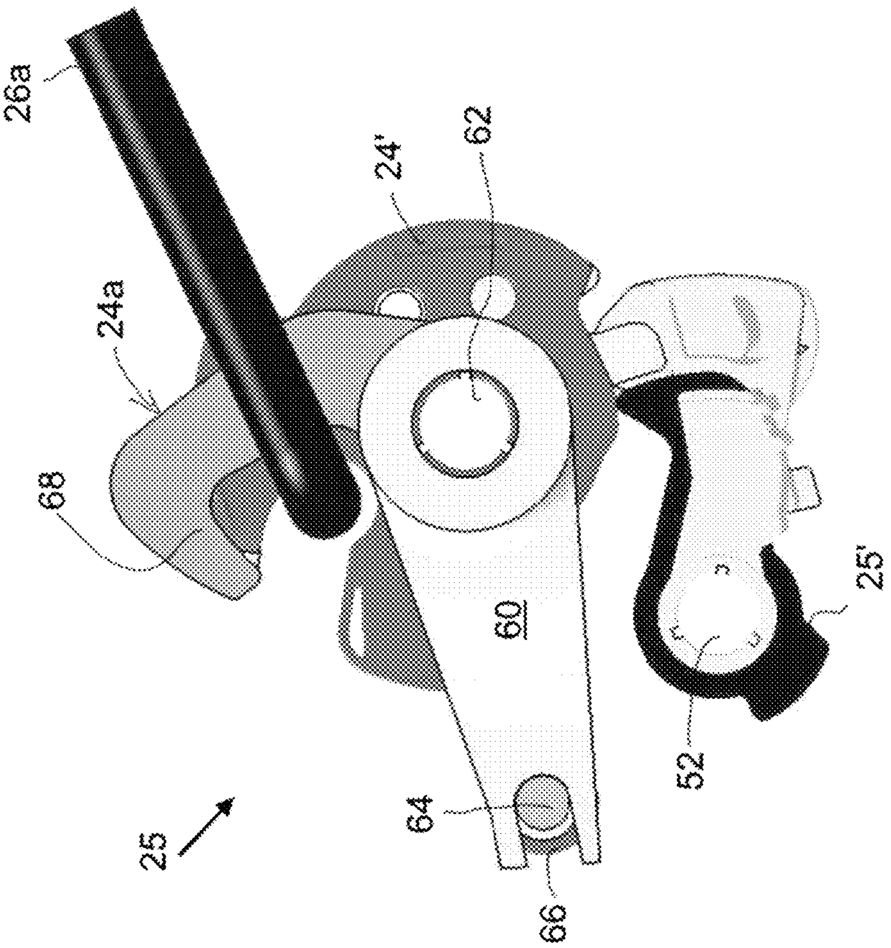

Referring to FIGS. 5, 8, shown is the generic latch 25 (e.g. representing latches 26, 28) in a locked state, such that the door 12, 14 is in the closed position (see FIG. **2*a* by example). The hook 68 of the catch 24*a* can optionally remain disengaged from the secondary striker 26*a* (e.g. adjacent but not in direct contact) such that a path (e.g. when the door is attempts to open) of the secondary striker 26*a* is constrained by the hook 68. Further, the ratchet 24' can engage the striker 26' in the slot 3', in order to retain the latch 25 in the locked state. Further, it is recognized that the pivot 62 of the catch 24*a* can be aligned with the shaft 50 of the ratchet 24' (see centerline axis CL of FIG. 7**).

Figure 6:
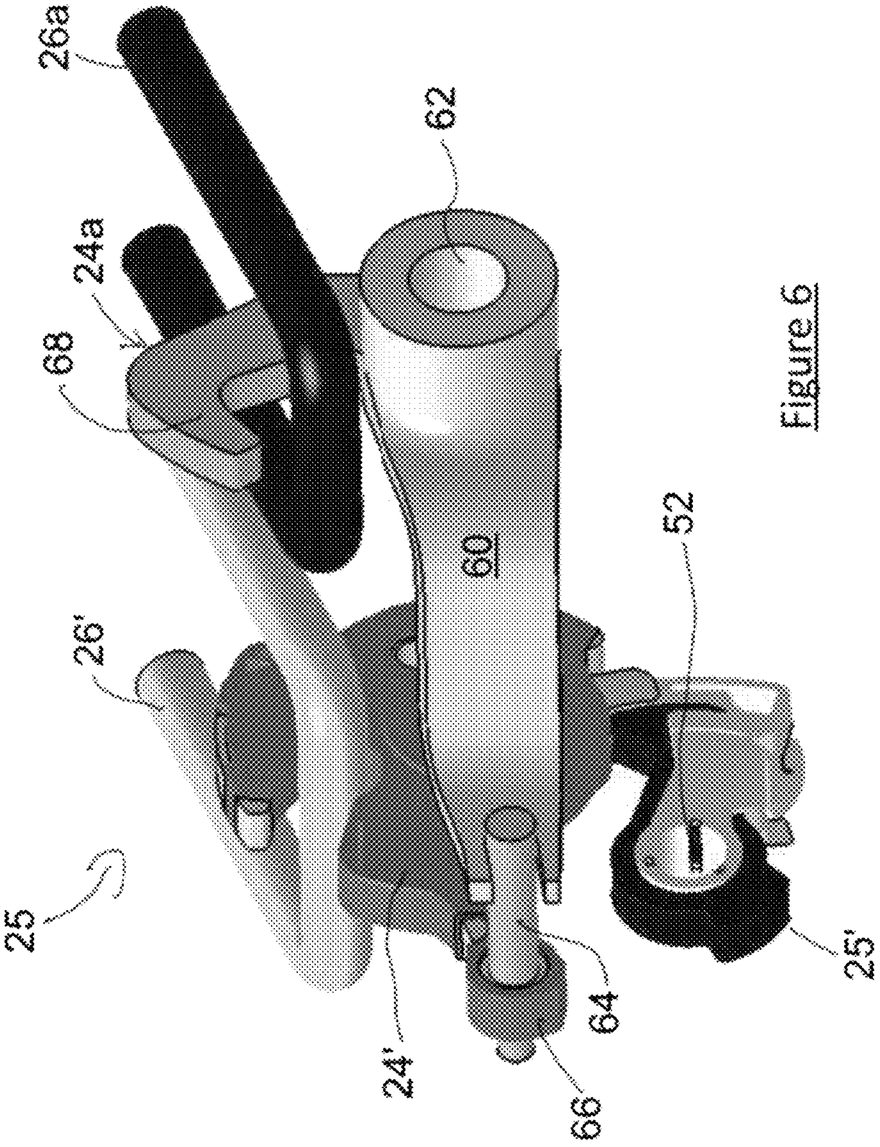
Figure 11:
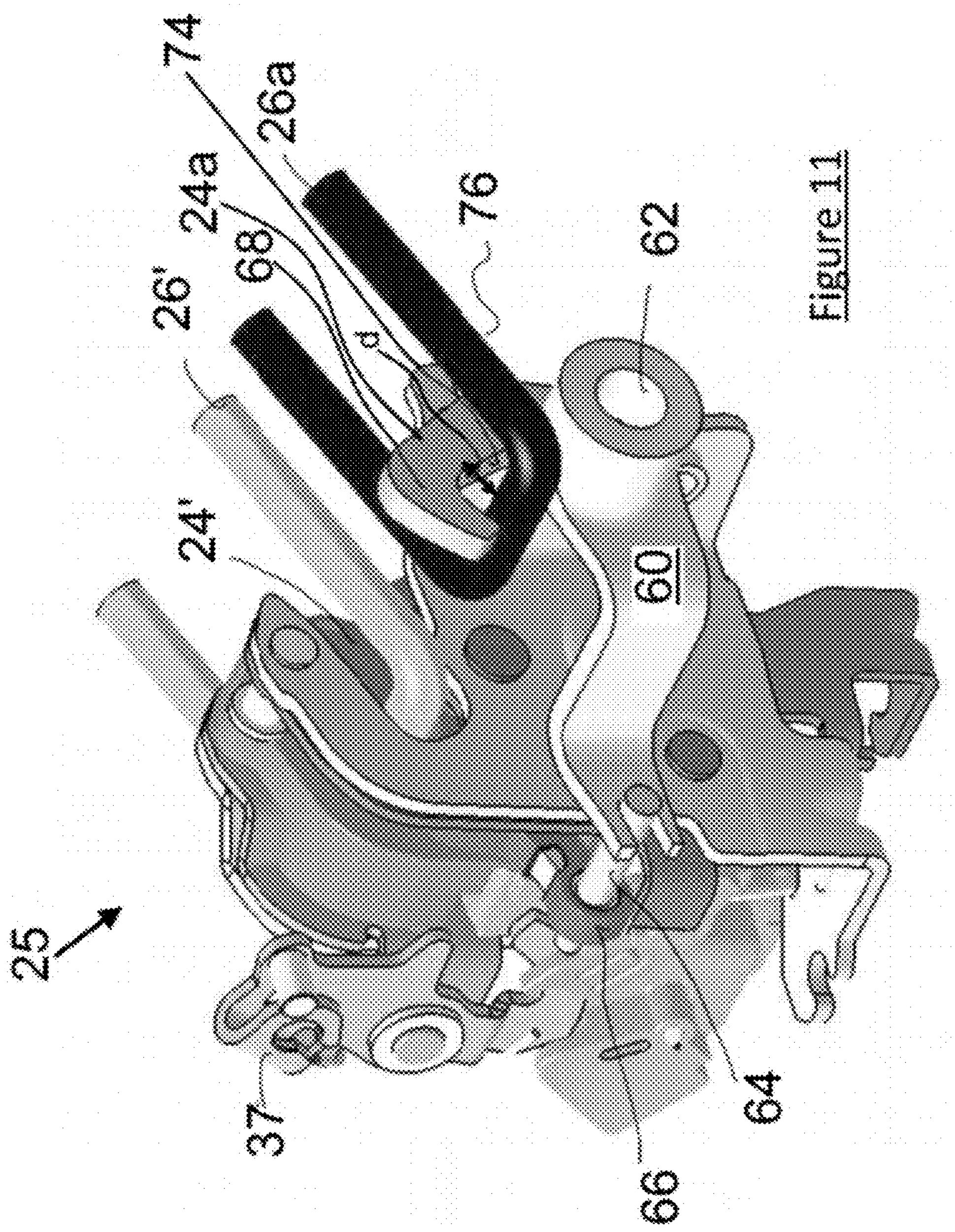
FIG. 11 is a perspective view of the latch of FIG. 10*b* in a latched state.

FIG. 6 shows the latch 25 in a front perspective view, in a locked state, such that the secondary striker **26*a* (e.g. a path thereof) is constrained by the hook 68 of the catch 24*a* while at the same time the secondary striker 26*a* is disengaged (e.g. not in contact or otherwise spaced apart from the hook 68) from the catch 24*a*. FIG. 7 shows a rear perspective view of the latch 25 in the locked state. Referring to FIG. 11, shown is an example of the secondary striker 26*a* being constrained but disengaged (i.e. spaced apart by distance d) from the hook 68 of the catch 24*a*. In other words, an exterior surface 72 of the secondary striker 26*a* remains spaced apart (by distance d) and out of contact with an adjacent surface 74 of the hook 68**.

Figure 10A:
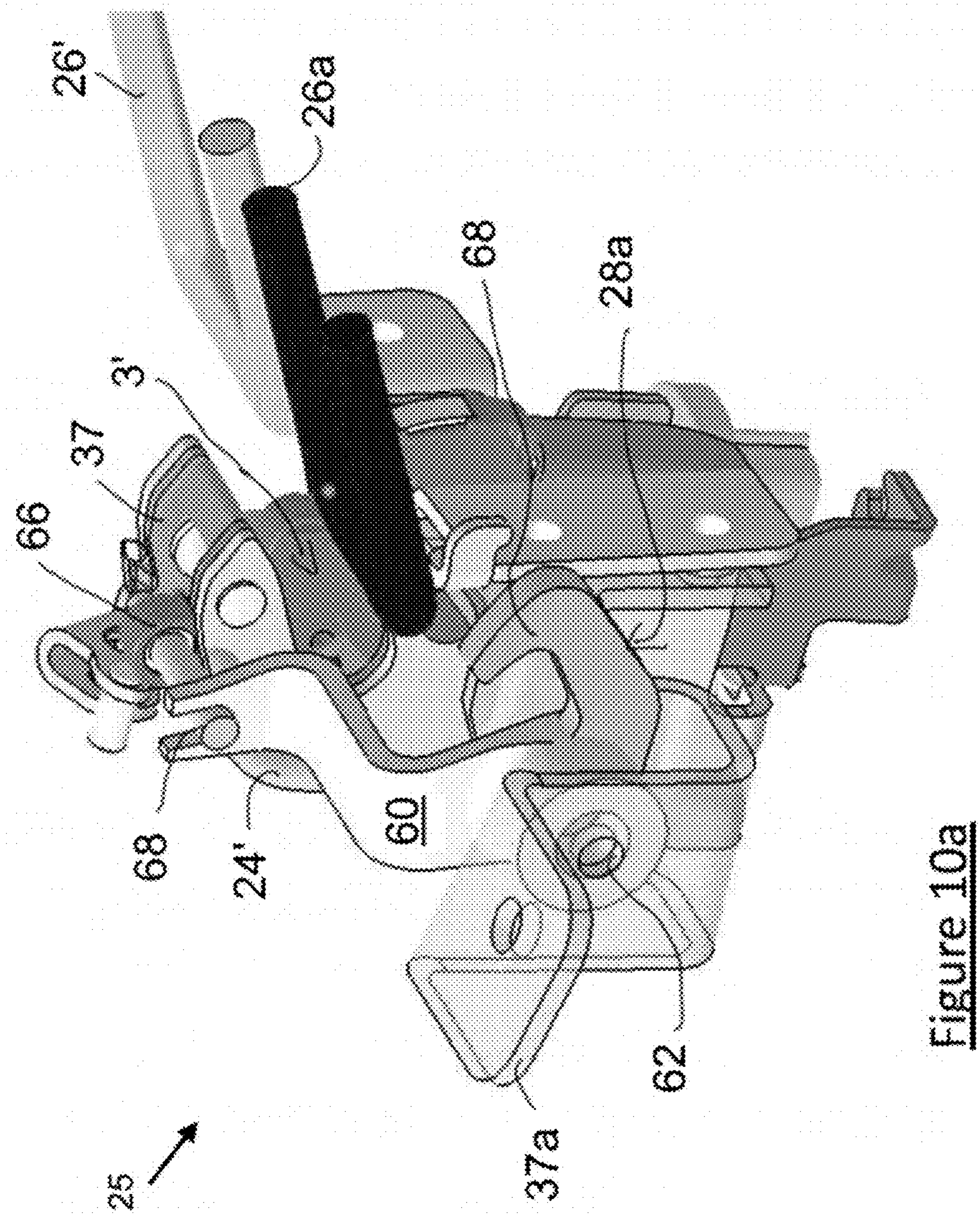
Figure 10B:
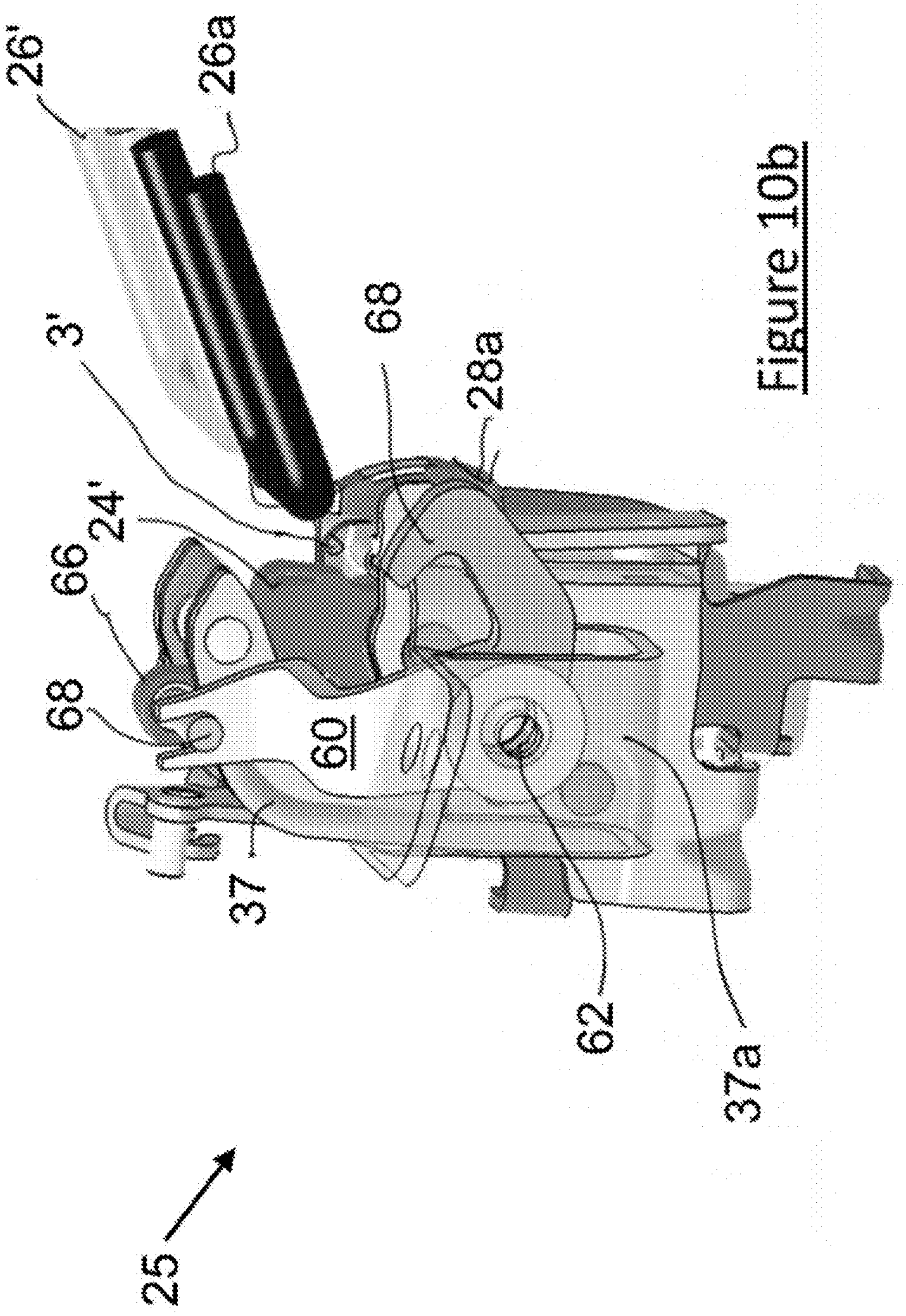

FIGS. 10, **10*b* show the latch 25 in an unlatched/unlocked state, such that the striker 26' is unconstrained by the ratchet 24' and the secondary striker 26' is unconstrained by the catch 24*a***.

Upon actuation of the handle assembly 22 (or other unlatching mechanism as coordinated by the actuator 36 once controlled—e.g. via activation by a FOB, etc.) when the primary door 12 is closed (see FIGS. **2*a*, 4), such that the striker 26' is constrained and engaged with the ratchet 24' and the secondary striker 26*a* is constrained (e.g. but disengaged—not in contact) with the catch 24*a*. The ratchet 24' and the catch 24*a* are then conjointly moved, e.g. rotated) to thus unconstrain the striker 26' and the secondary striker 26*a* to result in unlatching of the latch 25 (see FIGS. 2*d*, 9) to facilitate opening the door 12. Thus, the striker 26' and the secondary striker 26*a* (mounted on the vehicle body 9) of door 12 are releasably constrained with corresponding ratchet 24', catch 24*a* to releasably hold the door 12** in the closed position.

As further discussed below, the latches 25 can include a cinching feature as described by example with reference to FIGS. **3*a* and 3*b*. It is recognized that the actuator 36 (e.g. electric motor) can be operated to implement the cinching function via operation of the door handle 22, via operation of a key fob, via operation of one or more controls (e.g. buttons) located in the interior of the vehicle 10, and/or via one or more position sensors for sensing when the door 12 is positioned in the cinching position (e.g. based on a position sensor, such as a hall effect sensor, sensing the ratchet 24'** has reached a secondary ratchet position).

Referring to FIGS. **3*a* and 3*b*, shown is an example of a latch 25 containing latch components 23' (e.g. ratchet 24', pawl 25', optional cinch mechanism 2). Note that the catch 24*a* and the secondary striker 26*a* have been removed for exemplary descriptive purposes only. In this manner, the cinch mechanism 2 of the latch 25 can be used to forcefully provide, during deployment, some form of force assisted open operation (e.g. full open, partial open, etc.) of the door 12,14 and/or some form of force assisted close operation (e.g. full open, partial open, etc.) of the door 12,14, during opening/closing of the door 12,14. For example, an actuator (not shown) can be coupled to a cinch arm 20' via a link 33 and also to one or more latch components 23' (e.g. ratchet 24' and/or pawl 25'). As such, the cinch arm 20' can be actuated to operate the latch 25 from a partially closed position (e.g. secondary latched position) to a fully closed position (e.g. primary latched position), as the cinch arm 20' can be coupled to the ratchet 24' via a cinch lever arm 21'. It is also recognized that the link 33 can be provided as a rigid linkage rather than as a flexible linkage involving cables. For example, the link 33 can be embodied as a sector gear (or other series of rigid members) connected to the cinch arm 20' and/or the cinch lever 21' at one end of the link 33. It is also recognized that the cinch arm 20' can be configured to act directly on the striker 26' or secondary striker 26*a*, as desired, in order to perform the cinch operation on the latch 25**.

Referring again to FIGS. **3*a*, 3*b*, the latch 25 includes the number of latch elements 23' (e.g. ratchet 24', cinch lever 21' and pawl 25') that are configured to cooperate with the striker 26') in order to retain the striker 26' within a slot 3' when the door 12,14 is in the closed position (e.g. locked), or otherwise to drive the striker 26' out of the slot 3' when the door 12,14 is in the open position (e.g. as part of a door presenting or ice breaking function). The fish mouth or slot 3' is sized for receiving the striker 26' therein, in other words the slot 3' of the latch 25 is configured for receiving a keeper (e.g. striker 26'). The slot 3' has an open top end and a closed bottom end as shown. The latch elements 23' of the ratchet 24' and pawl 25' are pivotally secured to a frame plate 14' of the housing 37 via respective shafts 50, 52. The cinch arm 20' pivots about pivot 54. The ratchet 24' includes an arm 30' and arm 32' spaced apart to define a generally u-shaped slot there between (e.g. a hook of arm 30' and a lip of arm 32' that extends laterally beyond the hook). Note that in FIG. 3*b* the latch 25 with associated ratchet 24' is shown in the fully or primary closed position (e.g. facilitating the retention of the striker 26' within the slot 3'**).

Referring to FIGS. **3*a* and 3*b*, the latch components 23' can include a number of biasing elements (for example springs), such as a ratchet biasing element (not shown) that biases rotation of the ratchet 24' about the shaft 50 to drive the striker 26' out of the slot 3' (thus moving the door 12,14 towards the open position), pawl biasing element (not shown) that biases rotation of the pawl 25' about the shaft 52 to retain the ratchet 24' in the closed position (i.e. restrict rotation of the ratchet 24' about the shaft 52 under the influence of the ratchet biasing element), cinch biasing element (not shown) that can bias rotation of the cinch lever 21' towards an un-cinched position for the ratchet 24' about shaft 50 and linkage biasing element (not shown) that biases return of the link 33 towards an un-cinched position of the ratchet 24'. During operation of the cinch mechanism 2, actuation of the link 33 causes the attached cinch lever 21' and attached cinch arm 20' to be moved, thereby rotating the ratchet 24' about the shaft 50 towards and into the cinched position C, thus positioning the striker 26' in the fully closed position in the slot 3' of the latch 25 (see FIG. 3***b*).

In view of the above, it is recognized that the vehicle 10 can be embodied as having a B-pillarless door 12, 14 that has a latch 25 positioned at a top of the door 12,14. During a crash the roof 9*a* (see FIG. 1*a*) may buckle causing higher than normal loads compared to a door 12, 14 with a B-pillar (recognizing that the presence of the B-pillar can resist roof 9*a* buckling). As such, the latch 25 including the secondary striker 26*a* and the catch 24*a* provides increased coupling (i.e. releasable) between the door 12, 14 and the vehicle body 9.

Figure 12:
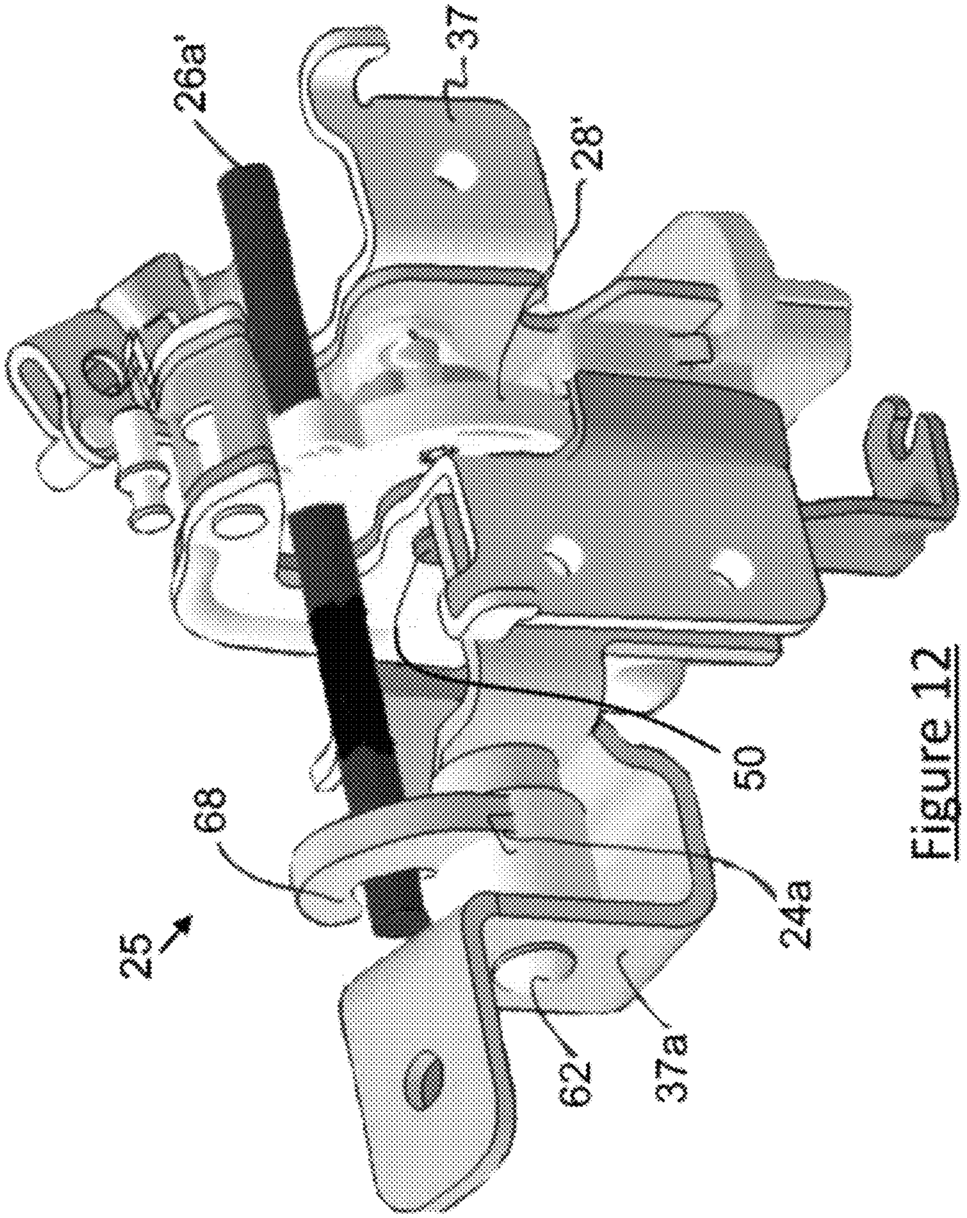
FIG. 12 is a further embodiment of the latch of FIG. 4.

As discussed above, the provision of the ratchet 24' and the tandem (e.g. slave to the master ratchet 24') catch 24*a* is advantageous. The catch 24*a* is also moveable with the ratchet 24' and can act as a second ratchet 24*a* by constraining opening of the door 12,14 by the secondary striker 26*a*. It is recognized that the secondary striker 26*a* can be separate (e.g. separate striker loop) from the striker 26' (see FIG. 4) or can be configured as one integral striker 26*a'* (e.g. a single striker loop), see FIG. 12.

Further, the catch 24*a* can be mounted to a separate housing portion 37*a* to the vehicle body 9 alongside the existing latch housing 37. The ratchet 24' is connected to the catch 24*a* by means of a connection 66 (e.g. pin 64) via a linkage 60 to provide for both the catch 24*a* and the ratchet 24' to rotate/move in tandem with respect to the striker 26'/secondary striker 26*a*. Further, the shaft 50 and the pivot 62 can be aligned (or otherwise in close alignment with one another) to help minimize lost motion at the shaft 50/pivot 62.

In operation, when the door 12, 14 closes, the striker 26' contacts the ratchet 24' which rotates and causes the catcher 24*a* (e.g. auxiliary ratchet 24*a*) to move (via the linkage 60) in tandem. At the same time, the secondary striker 26*a* is also entering the catch 24*a* and the catch 24*a* rotates about the secondary striker 26*a* in order to constrain the secondary striker 26*a* (e.g. without contact between the adjacent surfaces 72, 74—see FIG. 11).

Similarly, if the main ratchet 24' is released (e.g. by movement of the pawl 25'—see FIGS. 3*a*, 3*b*) and the striker 26' exits the slot 3' of the ratchet 24', so will the secondary striker 26*a* exit the catch 24*a* (e.g. without contacting the catch 24*a*). In other words, the main ratchet 24' and the secondary ratchet 24*a* are connected so as to rotate in tandem, and for example in response to disengagement of a pawl 25', such as a single pawl 25', from the main ratchet 24'. In other words, the main ratchet 24' and the secondary ratchet 24*a* are connected so as to inhibit rotation of the other ratchet, and for example in response to holding engagement of a single pawl 25' with the main ratchet 24. A single pawl 25' therefore is provided to hold both the main ratchet 24' and the secondary ratchet 24*a*, and a single activation of the pawl 25' is required to facilitate both the main ratchet 24' and the secondary ratchet 24*a* to move simultaneously from the locked position (see FIG. 6 for example) to the releasing position (see FIG. 10*b* for example). A latch 25 having a single frame plate 14', the frame plate 14' for mounting to one of a vehicle door 12, 14 and a vehicle body 10, and for mounting a main ratchet 24' and a secondary ratchet 24*a* coupled to each other for synchronized rotation is provided, wherein the main ratchet 24' and a secondary ratchet 24*a* are for each engaging with a striker 26', 26*a* mounted to the other one of the vehicle door and the vehicle body 10, or to another vehicle door, such that the release of the main ratchet 24' and a secondary ratchet 24*a* from a locked state to an unlocked state facilitates the vehicle door to move away from the vehicle body and/or the another vehicle door. Therefore, two strikers releaseably engageable with the latch 25 can be provided between a door 12, 14 and the vehicle body 10, or between two doors e.g. between door 12 and door 14 as examples. In general, the alignment of the secondary striker 26*a* in the catch 24*a* (e.g. constrained by the hook 68) when the door 12, 14 is closed is offset (providing the constrained) so that in the event of a crash the force generated by the secondary striker 26*a* on the catch 24*a* generates a closing moment to keep the catch 24*a* in place (i.e. constraining the secondary striker 26*a* by the hook 68. It is recognized that both the catch 24*a* and the ratchet 24' can cooperate during a crash to inhibit the door 12, 14 from opening.

For example, the latch 25 can be configured as having a master ratchet 24', and one or more (e.g. a plurality) of slave catches 24*a*. For example, the latch 25 can have a plurality of the catches 24*a*, such that each of the catches 24*a* are configured to constrain a respective one of a plurality of the secondary strikers 26*a*. For example, the catches 24*a* can be mounted on the housing 37*a* adjacent to one another. It is also recognized that the plurality of catches 24*a* can be misaligned with one another, i.e. they all are not positioned on the same pivot 62. It is recognized that the striker 26' and the one or more secondary strikers 26*a* can be separate (see FIG. 9) or can be integral with one another as one piece (see FIG. 12). It is recognized that the plurality of secondary strikers 26*a* can be separate or can be integral with one another, as desired.

It is recognized that the ratchet 24' can be referred to as a master ratchet 24', such that the operation of the latch 25 is such that in movement of the master ratchet 24' (e.g. electronically as an elatch by the controller 36, under influence of a biasing element upon release of the pawl 25', etc.), the movement of the slave ratchet(s) 24*a* is based on the movement of the master ratchet 24', for example as coordinated by the linkage connecting the master ratchet 24' to the one or more slave ratchets 24*a*.

Referring to FIGS. 4 and 13*a*, shown is an example operation 100 of opening a latch 25 for a closure panel 12,14 of a vehicle 10, the method comprising the steps of: releasing 102 a ratchet 24' mounted to a housing 37 of the latch 25 in order to unconstrain the ratchet 24' from a striker 26'; moving 104 the ratchet 24' in tandem with a catch 24*a* in order to unconstrain the catch 24*a* from a secondary striker 26*a*, the catch 24*a* mounted to the housing 37 (e.g. housing portion 37*a*) such that movement of the catch 24*a* is coupled to movement of the ratchet 24' by a linkage 60; and unlatching 106 the latch 25 by displacing the striker 26' from the ratchet 24' while also displacing the secondary striker 26*a* from the catch 24*a*.

Referring to FIGS. 4 and 13*b*, shown is an example operation 200 of closing a latch 25 for a closure panel 12,14 of a vehicle 10, the method comprising the steps of: entering 202 a striker 26' in to a slot 3' of a ratchet 24', the ratchet 24' mounted to a housing 37 of the latch 25 in order to constrain the striker 26' when latched; moving 204 the ratchet 24' in tandem with a catch 24*a* in order to constrain a secondary striker 26*a* by the catch 24*a*, the catch 24*a* mounted to the housing 37 such that movement of the catch 24*a* is coupled to movement of the ratchet 24' by a linkage 60; and releasably 206 latching the latch 25 by inhibiting further movement of the ratchet 24' (e.g. by engagement with a pawl 25') in conjunction with inhibiting further movement of the catch 24*a* by the linkage 60, thereby constraining the striker 26' by the ratchet 24' while also constraining the secondary striker 26*a* by the catch 24*a*.

What is claimed is:

1. A latch (25) for a closure panel (12) of a vehicle (10) for constraining a striker in a fully closed position within a slot, the latch comprising:

a housing (37);

a ratchet (24') mounted to the housing for releasably securing the striker in the slot (3') in the fully closed position and moveable between a locked position and a releasing position;

a pawl for securing the ratchet in the locked position and for releasing the ratchet from the locked position;

a catch (24*a*) mounted to the housing for releasably securing a secondary striker (26*a*) in the fully closed position; and a linkage (60) rigidly connecting the catch to the ratchet;

wherein the ratchet and the catch move simultaneously from the locked position to the releasing position in response to activation of the pawl to unconstrain the striker from the fully closed position.

2. The latch of claim 1, wherein the housing is mounted to the closure panel and the striker and the secondary striker are mounted to a body (9) of the vehicle.

3. The latch of claim 1, wherein the striker is separate from the secondary striker.

4. The latch of claim 1, wherein the striker is integral with the secondary striker.

5. The latch of claim 1, wherein a pivot (62) of the catch is aligned with a shaft (50) of the ratchet.

6. The latch of claim 1 further comprising the linkage having a first end (70) and a second end (72), such that the first end is connected to the catch at the pivot and the second end is connected to a connection (66) on the ratchet.

7. The latch of claim 6, wherein the connection is coupled to the second end by a pin (64).

8. The latch of claim 1, wherein a surface (76) of the secondary striker is disengaged from an adjacent surface (74) of the catch (24*a*) when the secondary striker is constrained by the catch.

9. The latch of claim 8, wherein a hook (68) of the catch constrains the secondary striker when the striker is constrained by the ratchet.

10. The latch of claim 1 further comprising a cinch mechanism (2) for providing a force assisted close operation of the closure panel during movement of the door.

11. The latch of claim 10, wherein the cinch mechanism has a cinch arm (20') configured to operate the ratchet from a partially closed position to a fully closed position.

12. The latch of claim 11, wherein the cinch arm is coupled to the ratchet via a cinch lever arm (21').

13. The latch of claim 11, wherein the cinch arm is coupled to the striker via a cinch lever arm.

14. The latch of claim 11, wherein the cinch arm is coupled to the catch via a cinch lever arm.

15. The latch of claim 1, further comprising a plurality of the catches, such that each of the catches are configured to constrain a respective one of a plurality of the secondary strikers.

16. The latch of claim 1, wherein the ratchet is a master ratchet and the catch is a slave ratchet.

17. The latch of claim 16, wherein the latch further comprises a controller (36) for operating a corresponding actuator to assist in movement of the master ratchet.

18. A method of opening a latch for a closure panel of a vehicle, the method comprising the steps of:

releasing a ratchet mounted to a housing of the latch in order to unconstrain the ratchet from a striker such that the ratchet is movable between a locked position and a releasing position;

securing the ratchet by a pawl in the locked position and then releasing the ratchet from the locked position by the pawl;

moving the ratchet with a catch from the locked position to the releasing position in response to activation of the pawl in order to unconstrain the catch from a secondary striker, the catch mounted to the housing such that movement of the catch is coupled to movement of the ratchet by a linkage; and unlatching the latch by simultaneously unconstraining the striker from the ratchet while also unconstraining the secondary striker from the catch.

19. A method of closing a latch for a closure panel of a vehicle, the method comprising the steps of:

entering a striker in to a slot of a ratchet, the ratchet mounted to a housing of the latch in order to constrain the striker when latched in a fully closed position within the slot, such that the ratchet is movable between a locked position and a releasing position;

securing the ratchet by a pawl in the locked position and then releasing the ratchet from the locked position by the pawl;

moving the ratchet with a catch from the locked position to the releasing position in response to activation of the pawl in order to constrain a secondary striker in the fully closed position within the slot by the catch, the catch mounted to the housing such that movement of the catch is simultaneous to movement of the ratchet by a linkage; and releasably latching the latch by inhibiting further movement of the ratchet in conjunction with inhibiting further movement of the catch by the linkage, thereby constraining the striker by the ratchet while also constraining the secondary striker by the catch.

20. The method of claim 19, wherein when constrained, the striker is engaged with the slot of the ratchet while the secondary striker is disengaged by being out of contact with the catch.

* * * * *